United States Patent
Bhatia

(10) Patent No.: US 9,392,567 B2
(45) Date of Patent: Jul. 12, 2016

(54) DISTRIBUTED SYSTEM ARCHITECTURE TO PROVIDE WIRELESS TRANSMITTER POSITIONING

(71) Applicant: QUALCOMM Incorporated, San Diego, CA (US)

(72) Inventor: Ashok Bhatia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 272 days.

(21) Appl. No.: 13/748,286

(22) Filed: Jan. 23, 2013

(65) Prior Publication Data

US 2014/0155086 A1  Jun. 5, 2014

Related U.S. Application Data

(60) Provisional application No. 61/731,998, filed on Nov. 30, 2012.

(51) Int. Cl.
*H04W 36/00* (2009.01)
*H04W 64/00* (2009.01)
(Continued)

(52) U.S. Cl.
CPC ............. *H04W 64/00* (2013.01); *G01S 5/0236* (2013.01); *G01S 5/0242* (2013.01); *G01S 5/0252* (2013.01);
(Continued)

(58) Field of Classification Search
CPC ... H04W 64/003; H04W 48/08; H04W 88/08; H04W 4/02; H04W 4/028; H04W 4/18; H04W 4/206; H04W 64/00
USPC ...................... 455/456.1, 456.2, 456.3, 422.1; 709/205
See application file for complete search history.

(56) References Cited

U.S. PATENT DOCUMENTS 7,263,379 B1  8/2007  Parkulo et al.
7,860,917 B2  12/2010  Moriwaki
(Continued)

FOREIGN PATENT DOCUMENTS

DE  102011006181 A1  9/2012
WO  2009141642 A1  11/2009
WO  2011158063 A1  12/2011

OTHER PUBLICATIONS

Gorlatova M. et al., "Managing base station location privacy", Military Communications Conference, 2011—MILCOM 2011, IEEE, Nov. 7, 2011, pp. 1201-1206, XP032092731, DOI: 10.1109/MILCOM.2011.6127464 ISBN: 978-1-4673-0079-7, p. 1201, left-hand column, lines 7-16, 33-44, p. 1203, left-hand column, line 10-line 21.

(Continued)

*Primary Examiner* — Khalid Shaheed
(74) *Attorney, Agent, or Firm* — Silicon Valley Patent Group LLP

(57) ABSTRACT

A distributed architecture provides the location of wireless transmitters to mobile devices for positioning, the location determined from at least one of crowdsourcing and wardriving. A server receives location data for wireless transmitters, such as an access point, a femtocell, Bluetooth Transmitter, radio-frequency identification (RFID) and near-field communication (NFC) station etc., from mobile devices. The server determines the locations of the wireless transmitters using the location data and provides the locations to the respective wireless transmitters. The wireless transmitters broadcast their identities and locations. Thus, a mobile device may receive the location directly from the wireless transmitter, eliminating the requirement of contacting a central server and downloading a regional almanac for positioning. This eliminates in a large number of scenarios the need to have data connectivity at the time of position calculation. Additionally, the wireless transmitters may transmit validation data to the server to validate or invalidate the determined location.

35 Claims, 5 Drawing Sheets

(51) Int. Cl.
*G01S 5/02* (2010.01)
*H04W 4/02* (2009.01)
*H04W 4/18* (2009.01)
*H04W 4/20* (2009.01)
*H04L 29/08* (2006.01)

(52) U.S. Cl.
CPC ............ *H04L 67/2842* (2013.01); *H04W 4/02* (2013.01); *H04W 4/028* (2013.01); *H04W 4/18* (2013.01); *H04W 4/20* (2013.01); *H04W 4/206* (2013.01)

(56) References Cited

U.S. PATENT DOCUMENTS

| | | | |
|---|---|---|---|
| 8,150,367 B1 | 4/2012 | Malladi et al. | |
| 2003/0058808 A1 | 3/2003 | Eaton et al. | |
| 2008/0176583 A1 | 7/2008 | Brachet et al. | |
| 2008/0227463 A1* | 9/2008 | Hizume et al. | 455/456.1 |
| 2011/0009085 A1 | 1/2011 | Albanes et al. | |
| 2011/0256875 A1* | 10/2011 | Edge | H04W 4/02 455/440 |
| 2011/0256894 A1* | 10/2011 | Khandelia et al. | 455/507 |
| 2012/0046860 A1 | 2/2012 | Curtis et al. | |
| 2012/0052883 A1 | 3/2012 | Austin et al. | |
| 2012/0208500 A1* | 8/2012 | Ledlie | H04M 1/67 455/410 |
| 2012/0208549 A1* | 8/2012 | Lau et al. | 455/456.1 |
| 2014/0073345 A1 | 3/2014 | Chintalapudi et al. | |

OTHER PUBLICATIONS

International Search Report and Written Opinion—PCT/US2013/063289—ISA/EPO—Mar. 5, 2014.

Lamarca A., et al., "Place Lab: Device Positioning Using Radio Beacons in the Wild" In: "Field Programmable Logic and Application", Jan. 1, 2005, Springer Berlin Heidelberg, Berlin, Heidelberg, XP055043782, ISSN: 0302-9743 ISBN: 978-3-54-045234-8 vol. 3468, pp. 116-133, DOI: 10.1007/11428572_8, Chapter 3; p. 120-p. 124.

Yadav K., et al., "Low Energy and Sufficiently Accurate Localization for Non-smartphones", Mobile Data Management (MDM), 2012 IEEE 13TH International Conference on, IEEE, Jul. 23, 2012, pp. 212-221, XP032473119 , DOI : 10.1109/MDM.2012.32 ISBN: 978-1-4673-1796-2, p. 213 , right-hand column , line 4-left-hand column, line 17 p. 213, right-hand column, line 34-p. 214, left-hand column, line 7 p. 214, right-hand column, line 2-line 6 p. 215, left-hand column chapter VII-B ; p. 220 , right-hand column, line 1-line 27.

* cited by examiner

DISTRIBUTED SYSTEM ARCHITECTURE TO PROVIDE WIRELESS TRANSMITTER POSITIONING

CLAIM OF PRIORITY UNDER 35 U.S.C. §119

This application claims under 35 USC §119 the benefit of and priority to U.S. Provisional Application No. 61/731,998, filed Nov. 30, 2012, and entitled "Distributed System Architecture To Provide Wireless Transmitter Positioning" which is assigned to the assignee hereof and which is incorporated herein by reference.

BACKGROUND

1. Background Field

Embodiments of the subject matter described herein are related generally to position determination based on signals from wireless transmitters, and more particularly to the distribution of almanac data for wireless transmitters for position determination.

2. Relevant Background

Position location systems for mobile devices in satellite positioning challenged/denied areas may use positioning based on signals from local wireless transmitters, such as cell towers or base stations for cellular wireless networks, or WLAN access points, femtocells, etc. However, positioning using wireless transmitters conventionally requires an assistance server that can provide an almanac that contains the locations of the wireless transmitters.

Conventionally, almanac databases are built using crowdsourcing, wardriving and/or a combination of both. Both crowdsourcing and wardriving require that multiple mobile devices collect data related to the location of the wireless transmitters and submit the collected data to a centrally located server. The server combines the collected data from multiple users to generate the almanac database that includes the locations of the wireless transmitters. In order to use wireless transmitters for positioning, a mobile device accesses the almanac database through the server, or different servers, and uses the locations for visible wireless transmitters to determine the position of the mobile device. As the almanac database may be large, a mobile device typically downloads only the relevant regional content, sometimes referred to as "tiles," from the server.

FIG. 1, by way of example, illustrates a system 10 in which a mobile device 12 provides collected wireless transmitter data to a server 14 and accesses the data through content servers 16. The server 14 aggregates crowdsourced and/or wardriving information from multiple mobile devices to create the almanac database for wireless transmitters that includes the locations of the wireless transmitters. When the mobile device 12 uses local wireless transmitters for positioning, the mobile device 12 contacts one or more content servers 16 (which may include the server 14) to download relevant regional content based on visible wireless transmitters. After downloading the regional content from the content servers 16, the mobile device 12 can obtain the locations of visible wireless transmitters to be used in determining the position of the mobile device 12.

When a position fix is required by the mobile device 12, access to the necessary regional content is required in real time. Thus, the mobile device 12 must have data connectivity to access the content servers 16 to acquire the regional content, or the mobile device 12 must have previously downloaded the regional content. Data connectivity, however, cannot always be assured. Moreover, at the time of a position fix calculation, the mobile device 12 only requires the locations of visible wireless transmitters, i.e., wireless transmitters that the mobile device 12 is actually wirelessly observing. The regional content, however, typically includes multiple nearby wireless transmitters that are not visible to the mobile device 12, which is downloaded onto the mobile device 12 along with the visible wireless transmitters. Accordingly, downloading regional content is a waste of bandwidth as only the data related to visible wireless transmitters is needed. Additionally, downloading regional content by mobile devices before a position fix is required is also a waste of bandwidth as the position fix may not be required at all.

SUMMARY

A distributed architecture provides the location of wireless transmitters to mobile devices for positioning, the location determined from at least one of crowdsourcing and wardriving. A server receives location data for wireless transmitters, such as an access point, a femtocell, Bluetooth Transmitter, radio-frequency identification (RFID) and near-field communication (NFC) station etc., from mobile devices. The server determines the locations of the wireless transmitters using the location data and provides the locations to the respective wireless transmitters. The wireless transmitters broadcast their identities and locations. Thus, a mobile device may receive the location directly from the wireless transmitter, eliminating the requirement of contacting a central server and downloading a regional almanac for positioning. This eliminates in a large number of scenarios the need to have data connectivity at the time of position calculation. Additionally, the wireless transmitters may transmit validation data to the server to validate or invalidate the determined location.

In one implementation, a method including receiving location data about a wireless transmitter, the location data obtained from at least one of crowdsourcing and wardriving; determining a location for the wireless transmitter using the location data; and providing the location for the wireless transmitter to the wireless transmitter.

In one implementation, an apparatus including an external interface capable of communicating with mobile devices to receive location data about a wireless transmitter, the location data obtained from at least one of crowdsourcing and wardriving; and a processor configured to determine a location for the wireless transmitter using the location data, and to cause the external interface to transmit the location for the wireless transmitter to the wireless transmitter.

In one implementation, an apparatus including means for receiving location data about a wireless transmitter, the location data obtained from at least one of crowdsourcing and wardriving; means for determining a location for the wireless transmitter using the location data; and means for providing the location for the wireless transmitter to the wireless transmitter.

In one implementation, a non-transitory computer-readable medium including program code stored thereon, including program code to determine a location for a wireless transmitter using location data received about the wireless transmitter, the location data obtained from at least one of crowdsourcing and wardriving; and program code to provide the location for the wireless transmitter to the wireless transmitter.

In one implementation, a method of controlling a wireless transmitter, the method including receiving with the wireless transmitter a location of the wireless transmitter from a remote server, the location determined using at least one of crowdsourcing and wardriving; and broadcasting an identity of the wireless transmitter with the location.

In one implementation, a wireless transmitter comprising: a wireless interface; an external interface that receives a location of the wireless transmitter from a remote server, the location determined using at least one of crowdsourcing and wardriving; and a processor configured to cause the wireless interface to broadcast an identity of the wireless transmitter with the location.

In one implementation, a wireless transmitter including means for receiving a location of the wireless transmitter from a remote server, the location determined using at least one of crowdsourcing and wardriving; and means for broadcasting an identity of the wireless transmitter with the location.

In one implementation, a non-transitory computer-readable medium including program code stored thereon, including program code to receive a location of a wireless transmitter from a remote server, the location determined using at least one of crowdsourcing and wardriving; and program code to broadcast an identity of the wireless transmitter with the location.

In one implementation, a method including receiving with a mobile device control frames from a plurality of wireless transmitters, each control frame comprising an identity of a wireless transmitter and a location of the wireless transmitter, wherein the wireless transmitter is selected from a group consisting of an access point, a femtocell, Bluetooth Transmitter, radio-frequency identification (RFID) and near-field communication (NFC) station; performing a position calculation for the mobile device using the location of each of the plurality of wireless transmitters; and reporting a position of the mobile device for a location based service application when the position calculation is successful.

In one implementation, a mobile device including a wireless interface capable of receiving control frames from a plurality of wireless transmitters, each control frame comprising an identity of a wireless transmitter and a location of the wireless transmitter, wherein the wireless transmitter is selected from a group consisting of an access point, a femtocell, Bluetooth Transmitter, radio-frequency identification (RFID) and near-field communication (NFC) station; and a processor configured to perform a position calculation for the mobile device using the location of each of the plurality of wireless transmitters, and report a position for a location based service application when the position calculation is successful.

In one implementation, a mobile device including means for receiving with a mobile device control frames from a plurality of wireless transmitters, each control frame comprising an identity of a wireless transmitter and a location of the wireless transmitter, wherein the wireless transmitter is selected from a group consisting of an access point, a femtocell, Bluetooth Transmitter, radio-frequency identification (RFID) and near-field communication (NFC) station; means for performing a position calculation for the mobile device using the location of each of the plurality of wireless transmitters; and means for reporting a position of the mobile device for a location based service application when the position calculation is successful.

In one implementation, a non-transitory computer-readable medium including program code stored thereon for determining a position of a mobile device, includes program code to receive with a mobile device control frames from a plurality of wireless transmitters, each control frame comprising an identity of a wireless transmitter and a location of the wireless transmitter, wherein the wireless transmitter is selected from a group consisting of an access point, a femtocell, Bluetooth Transmitter, radio-frequency identification (RFID) and near-field communication (NFC) station; program code to perform a position calculation for the mobile device using the location of each of the plurality of wireless transmitters; and program code to report the position of the mobile device for a location based service application when the position calculation is successful.

DETAILED DESCRIPTION

Figure 2:
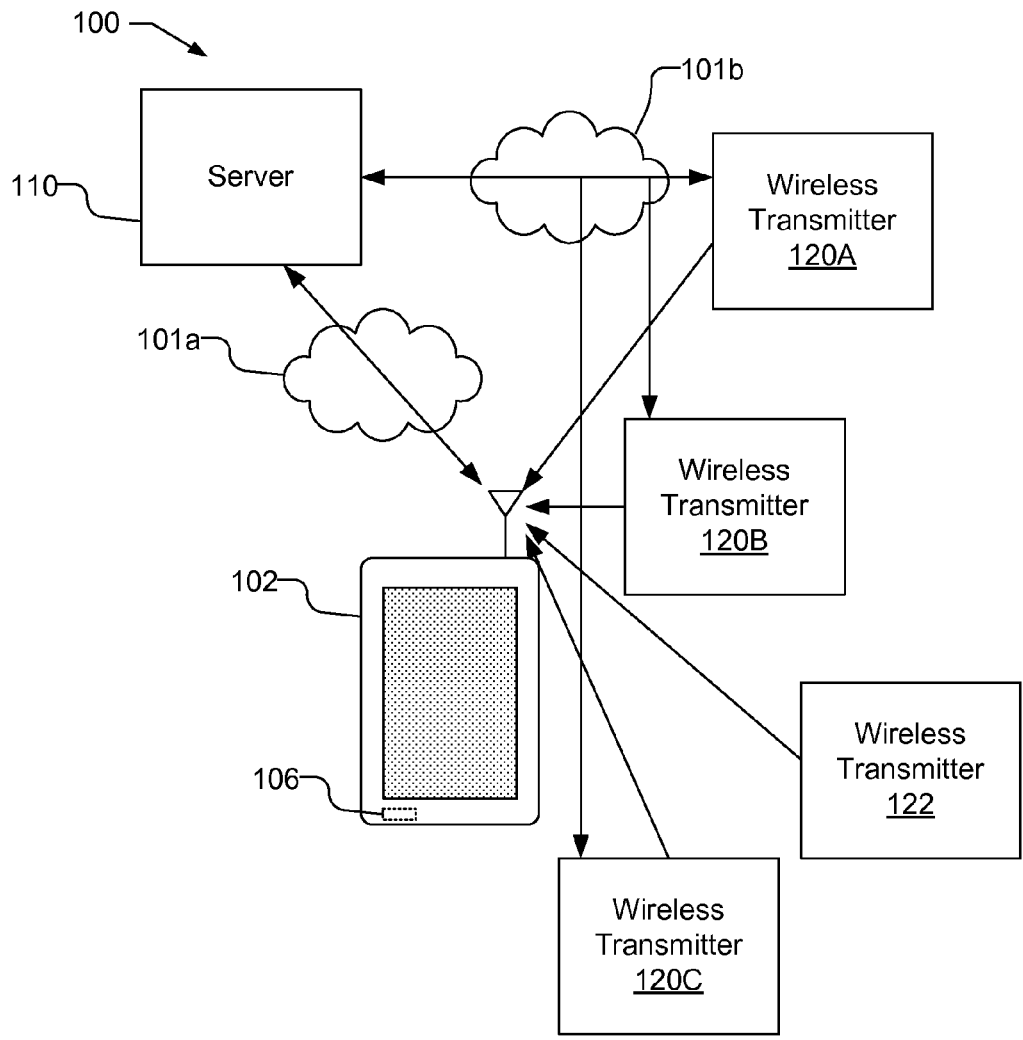
FIG. 2 illustrates a system with a distributed architecture that provides locations of wireless transmitters to mobile devices for positioning.

FIG. 2 illustrates a system 100 with a distributed architecture that provides the location of wireless transmitters to mobile devices for positioning, where the locations are determined from at least one of crowdsourcing and wardriving. System 100 includes a mobile device 102 that is in communication with a server 110 via a wireless network 101a. Mobile device 102 may provide server 110 with information regarding any visible wireless transmitters, e.g., access points, femtocells, or any other wireless transmitters that mobile device may use for positioning. Server 110 aggregates data related to the location of wireless transmitters that is collected via crowdsourced and/or wardriving from multiple mobile devices, as is well known, to produce a database of wireless transmitters and their associated locations. The data related to location of the wireless transmitters may include, e.g., known locations of mobile devices, received signal strength indicator (RSSI) measurements and/or round trip time (RTT) measurements for wireless transmitters, and any other data that may be used to determine the location of the wireless transmitters, and is accordingly sometimes referred to herein as "location data." As illustrated in FIG. 2, the server 110 periodically communicates with wireless transmitters 120A, 120B, and 120C, sometimes collectively referred to as wireless transmitters 120, through a network 101b, which may be a wired or wireless network. The server 110 provides each wireless transmitter 120 with its respective location as determined through crowdsourcing and/or wardriving.

Figure 1:
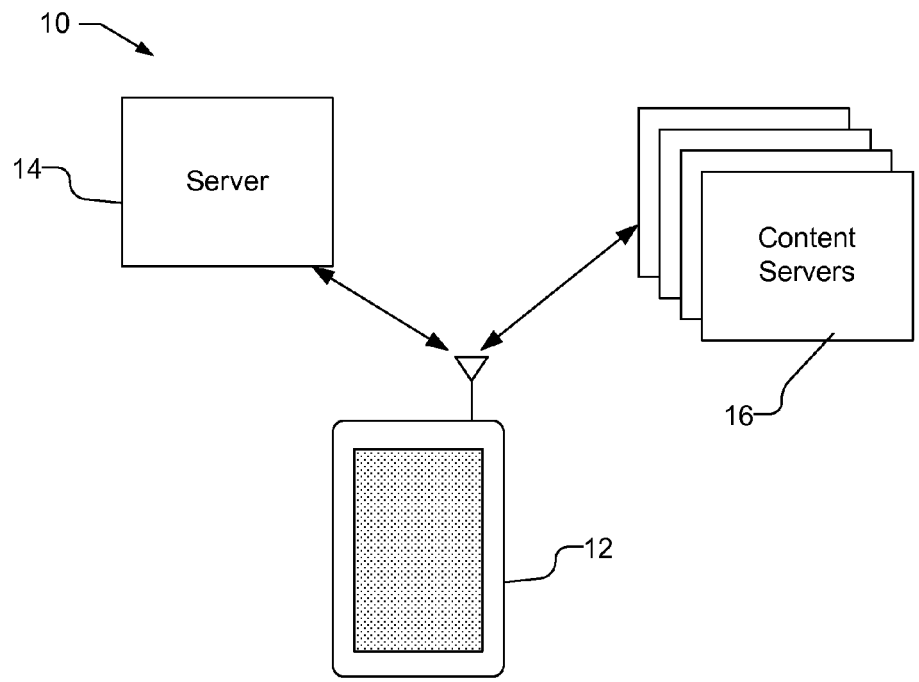
FIG. 1 illustrates a conventional system in which a mobile device provides collected data to a server and downloads regional almanacs from the server.
Figure 3:
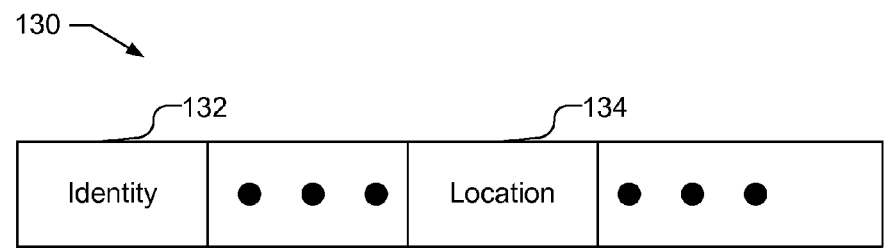
FIG. 3 illustrates an example of a control frame that includes the identity of the wireless transmitters as well as the location of the wireless transmitter.

Wireless transmitters 120 broadcast their identities as well as their locations as provided by the server 114. For example, the wireless transmitters 120 may transmit their locations using a few bytes of data on control frames or other appropriate broadcast message or overhead channels. The location may be limited to latitude, longitude, and potentially the floor or altitude, or any other desired coordinate system or type of information with which the absolute or relative location of the wireless transmitter 120 may be identified and which can be distributed as a part of control frame or other appropriate broadcast message or overhead channels. Additional information that may be useful for position determination of the mobile device 102 may also be included, and thus, the wireless transmitters 120 may be sometimes said to transmit location information. FIG. 3 illustrates, by way of example, a control frame 130 that may be produced by a wireless transmitter 120 to broadcast its identify and location. A control frame 130 by way of example may be a beacon frame in IEEE 802.11, System Parameters (For CDMA Femto Cell) or other kind of Broadcast channels. Among other information, the control frame 130 is configured to include the identity 132 of the wireless transmitter, e.g., the service set identifier (SSID), as well as the location 134, which if not already included in the control frame 130 may be added as an OEM/Vendor proprietary field.

When the mobile device 102 performs a scan for nearby wireless transmitters, mobile device 102 receives the broadcast identification and locations for each of the nearby, i.e., visible, wireless transmitters 120A, 120B, and 120C, without connecting to the wireless transmitters. While decoding the identity of the wireless transmitters, e.g., MAC address or Cell ID, the mobile device 102 will also obtain the locations. As illustrated in FIG. 2, while mobile device 102 may still receive broadcast information from additional wireless transmitters, such as wireless transmitter 122, which does not receive its location from server 110 and does not broadcast its location, mobile device 102 may simply ignore wireless transmitter 122 for the purpose of determining a position fix. Thus, the mobile device 102 receives broadcasted locations directly from visible wireless transmitters 120 and therefore does not need to access a remote content server to receive regional content, i.e., tile information. Moreover, as mobile device 102 receives locations directly from the visible wireless transmitters, there is no need to download a regional database on the mobile device 102 thereby reducing bandwidth usage. As illustrated, the mobile device 102 may include a positioning module 106 that may use the broadcasted locations of wireless transmitters 120A, 120B, and 120C to determine a position fix for the mobile device 102.

If desired, wireless transmitters 120 may communicate with server 110 via network 101b to provide data relevant to each wireless transmitter to the server 110. For example, wireless transmitters 120 may provide data such as the identity of any nearby wireless transmitters and/or a time and duration of a power cycle for the wireless transmitter. Server 110 may use the data to determine the validity of the location associated with a wireless transmitter. For example, if a wireless transmitter 120A indicates that it has recently undergone a power cycle, e.g., powered down and powered up, the wireless transmitter 120A may have been moved and therefore the validity of the location associated with the wireless transmitter 120A is in question. If the power cycle was brief, e.g., 15 seconds, it is unlikely that the wireless transmitter 120A was moved. If the power cycle was relatively large, e.g., 5 minutes or more, the wireless transmitter 120A may be have been moved and, thus, the location associated with the wireless transmitter 120A can no longer be relied upon. Accordingly, the server 110 may flag the location associated with wireless transmitter 120A as uncertain, update wireless transmitter 120A with an undetermined location via network 101b, and await location data obtained from crowdsourcing and/or wardriving to re-validate the location or determine a new location for wireless transmitter 120A. If desired, after a power cycle, or after a power cycle that exceeds a threshold, the wireless transmitter 120A may disable the broadcasting of its location due to uncertainty of its location until server 110 confirms the re-validates the location or determine a new location for wireless transmitter 120A.

Data related to the identity of any nearby wireless transmitters may be used to validate a location associated with a wireless transmitter. For example, wireless transmitter 120A may provide to the server 110 the identity of visible wireless transmitters 120B, 120C, and 122. If the wireless transmitters that are identified as being visible by wireless transmitter 120A changes, the server 110 may flag the location associated with wireless transmitter 120A as uncertain and require re-validation or determination of a new location for wireless transmitter 120A. Alternatively, if wireless transmitter 120A indicates that, e.g., wireless transmitter 120B is no longer visible, but wireless transmitters 120C and 122 are visible, the server 110 may flag the location associated with wireless transmitter 120B as uncertain and require re-validation or determination of a new location for wireless transmitter 120A. Similarly, the wireless transmitter 120A may disable the broadcasting of its location if a sufficient number of visible wireless transmitters have changed.

Thus, the need for a mobile device 102 to download a regional almanac from a content server for wireless transmitter based positioning is eliminated. Each wireless transmitter downloads its own location from the server, e.g., using internet connectivity. This download may be performed infrequently, e.g., once a month, or after a power cycle. The wireless transmitters obtain their respective locations from server 110 and, thus, do not require any self-location capability. When the mobile device 102 performs a scan for nearby wireless transmitters decoding the identity of the wireless transmitters, e.g., MAC address or Cell ID, the locations are also obtained by the mobile device. Thus, the extra step of downloading the regional almanac from a content server at the time of position fix may be eliminated.

Moreover, mobile device 102 does not require data connectivity to wireless transmitters 120 for the purpose of position location, as the wireless transmitters 120 broadcast their locations and no server access is required. The mobile device 102 may still perform crowdsourcing and may require connectivity for the purpose of submitting crowdsourced data to the server 110. However, submitting crowdsourced data is not a "real time" activity as the crowdsourced data can be buffered for an extended period of time on the mobile device and can be opportunistically uploaded to the server 110, e.g., when free data connectivity (e.g., WiFi connection) is available. Moreover, power consumption of the mobile device 102 is reduced due to reduced server communication.

If desired, mobile device 102 may still contact server 110 (or other content server) to acquire a regional almanac for wireless transmitters that have not downloaded their locations from server 110, e.g., wireless transmitter 122 in FIG. 2. For example, mobile device 102 may first attempt to obtain a position fix using the locations available in control frames broadcasted by visible wireless transmitters. If a position fix using broadcast locations is not possible, mobile device 102 may attempt to contact server 110 to download a regional almanac. The mobile device 102 may use a combination of the broadcast locations from visible wireless transmitters 120 as well as locations obtained from the server in a regional almanac to obtain a position fix. Wireless transmitters that download their associated locations from the server 110 may be eliminated from the regional almanac. Thus, the regional almanac downloaded by the mobile device 102 may be reduced in size thereby reducing data bandwidth requirements. Moreover, eliminating wireless transmitters that can download their associated locations from the server 110 from the regional almanac reduces the amount of data a piracy attacker can potentially download from the server 110 in a successful attack.

Figure 4:
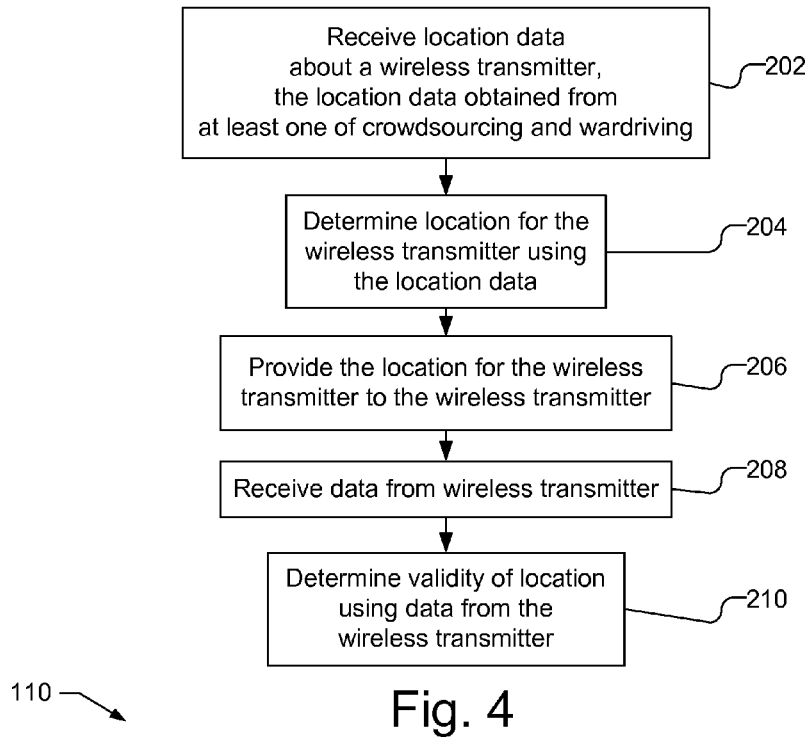
FIG. 4 is a flow chart illustrating a method of providing a distributed architecture by a server.

FIG. 4 is a flow chart illustrating a method of providing a distributed architecture by a server. As illustrated, a server receives location data about a wireless transmitter, the location data obtained from at least one of crowdsourcing and wardriving (202). As discussed above, the location data may include any data that may be used to derive the location of the wireless transmitter and may include, e.g., RSSI measurements and/or RTT measurements for the wireless transmitter and known locations of mobile devices performing the RSSI and/or RTT measurements, as well as any other data that may be used to determine the location of the wireless transmitter. Using the location data, the server determines the location for the wireless transmitter (204). Determining a location for a wireless transmitter based on location data, e.g., obtained from crowdsourcing and/or wardriving, is well known in the art. The server then provides the determined location to the wireless transmitter (206). It may be desirable to authenticate the wireless transmitter, e.g., using an authentication code, before providing the determined location, e.g., to ensure that the wireless transmitter is authorized to receive the determined location from the server. Additionally, if desired, the server may receive data from the wireless transmitter (208) and determine the validity of the location for the wireless transmitter using the data received from the wireless transmitter (210). For example, the data received by the server from the wireless transmitter may be an identity of one or more nearby wireless transmitters and/or a time and duration of a power cycle for the wireless transmitter. The validity of the stored location for the wireless transmitter may be determined based on the likelihood that the wireless transmitter has been moved, e.g., whether the identities of nearby wireless transmitters have changed and/or the wireless transmitter was powered down for an extended period of time.

Figure 5:
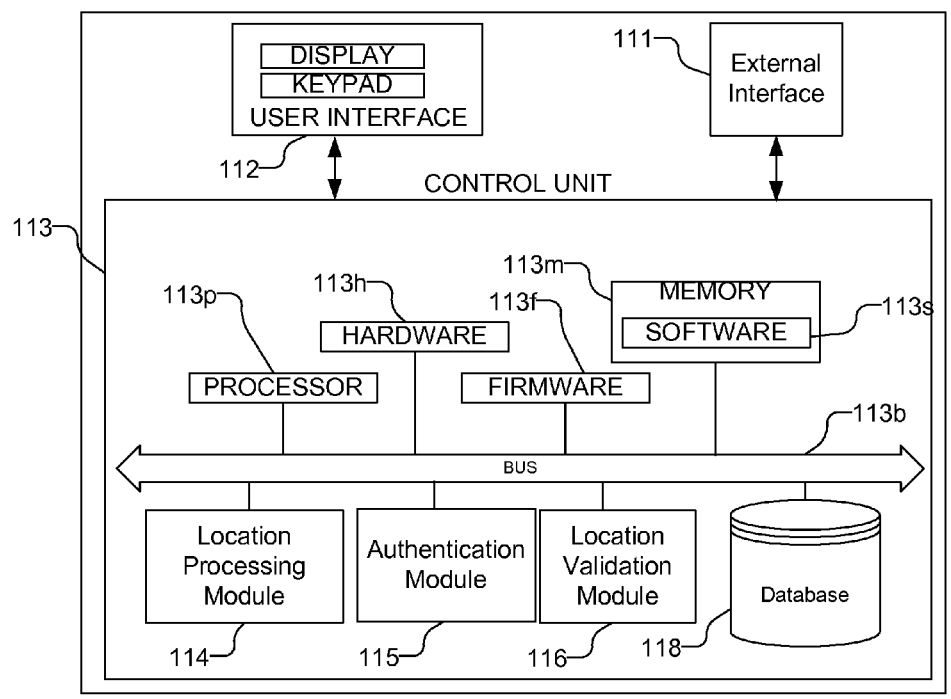
FIG. 5 is a block diagram of a server capable of providing a distributed architecture for positioning.

FIG. 5 is a block diagram of a server 110 capable of providing a distributed architecture for positioning. The server 110 includes an external interface 111 that is used to communicate with and receive location data from mobile devices, such as crowdsourced and/or wardriving data, as well as provide the locations of the wireless transmitters to the wireless transmitters. The server 110 may further include a user interface 112 that may include e.g., a display, as well as a keypad or other input device through which the user can input information into the server 110.

The external interface 111 may be a wired interface to a router (not shown) or a wireless interface used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The server 110 also includes a control unit 113 that is connected to and communicates with the external interface 111. The control unit 113 accepts and processes the location data provided by mobile devices and the wireless transmitters themselves when applicable. The control unit 113 may be provided by a bus 113*b*, processor 113*p* and associated memory 113*m*, hardware 113*h*, firmware 113*f*, and software 113*s*. The control unit 113 is further illustrated as including a location processing module 114, which aggregates received location data obtained from crowdsourcing and/or wardriving and determines the locations of wireless transmitters based on received location data. An authentication module 115 may be used to authenticate a wireless transmitter to confirm that a wireless transmitter is authorized to receive the location, e.g., using an authentication code. A location validation module 116 may be used to validate stored locations of wireless transmitters based on, e.g., data received from wireless transmitters themselves. A database 118 may be used to store the identities, authentication codes, and locations of wireless transmitters.

The location processing module 114, authentication module, and location validation module 116 are illustrated separately from processor 113*p* for clarity, but may be part of the processor 113*p* or implemented in the processor based on instructions in the software 113*s* which is run in the processor 113*p*. It will be understood as used herein that the processor 113*p* can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 113*h*, firmware 113*f*, software 113*s*, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 113$m$ and executed by the processor 113$p$. Memory 113$m$ may be implemented within or external to the processor 113$p$. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, the server 110 includes a means for receiving location data about a wireless transmitter, the location data obtained from at least one of crowdsourcing and wardriving, which may be, e.g., the external interface 111; a means for determining a location for the wireless transmitter using the location data, such as the location processing module 114; and means for providing the location for the wireless transmitter to the wireless transmitter, such as the external interface 111. The server 110 may also include means for authenticating that the wireless transmitter is authorized to receive the location for the wireless transmitter prior to providing the location for the wireless transmitter to the wireless transmitter, which may be, e.g., the authentication module 115. The server 110 may also include means for receiving data from the wireless transmitter, such as the external interface 111; and means for determining validity of the location for the wireless transmitter using the data received from the wireless transmitter, such as the location validation module 116.

Figure 6:
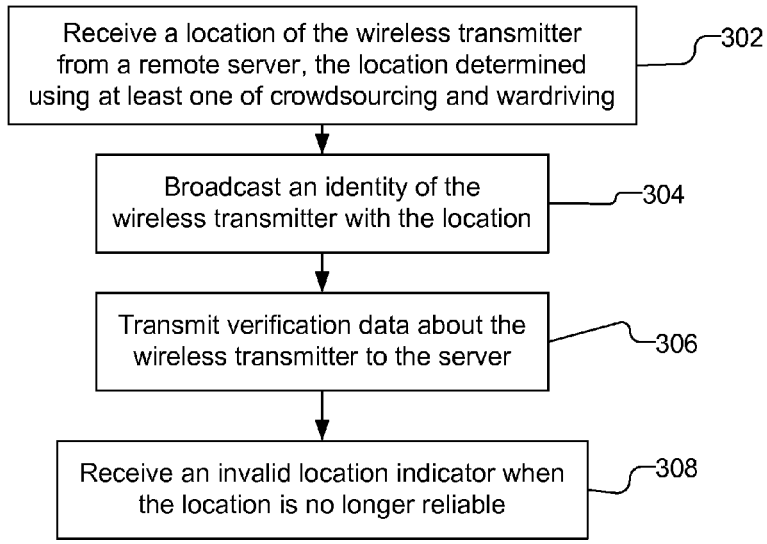
FIG. 6 is a flow chart illustrating a method of controlling a wireless transmitter in a distributed architecture for positioning.

FIG. 6 is a flow chart illustrating a method of controlling a wireless transmitter in a distributed architecture. As illustrated, a wireless transmitter receives a location of the wireless transmitter from a remote server, the location determined using at least one of crowdsourcing and wardriving (302). The wireless transmitter broadcasts the identity of the wireless transmitter along with the location (304). If desired, the wireless transmitter may also transmit verification data about the wireless transmitter to the server (306) and may receive an invalid location indicator when the location of the wireless transmitter is no longer reliable (308). The verification data may be, e.g., an identity of a nearby wireless transmitter and/or a time and duration of a power cycle for the wireless transmitter.

Figure 7:
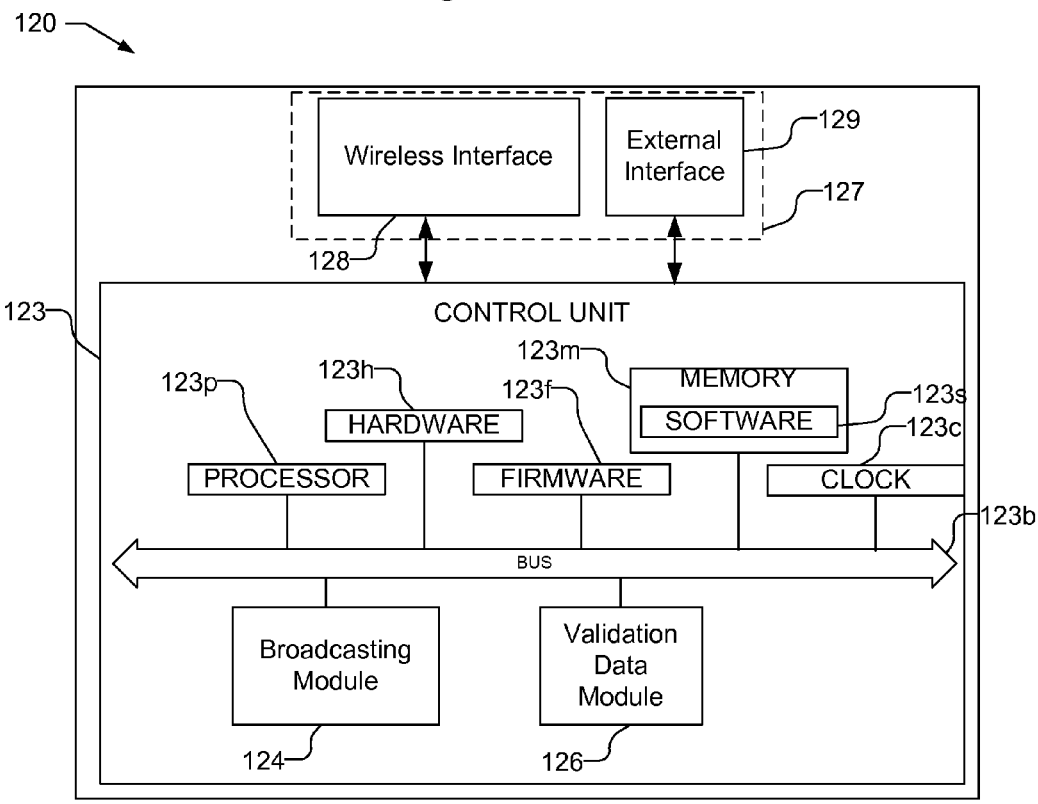
FIG. 7 is a block diagram of a wireless transmitter in a distributed architecture for positioning.

FIG. 7 is a block diagram of a wireless transmitter 120 in a distributed architecture for positioning. The wireless transmitter 120 includes an interface 127, which may include a wireless interface 128 that is used to broadcast an identity and location, as well as communicate with and received identity information from other nearby wireless transmitters. The interface 127 of the wireless transmitter 120 may further include an external interface 129, which may be a wired interface, to communicate with a server, e.g., to receive from the server a location determined using at least one of crowdsourcing and wardriving, and to provide verification data about the wireless transmitter to the server. If desired, the wireless transmitter 120 may communicate with the server via the wireless interface 128.

The wireless interface 128 and external interface 129 may be used in any various communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The wireless transmitter 120 also includes a control unit 123 that is connected to and communicates with the interface 127. The control unit 123 accepts and processes the location from the server and broadcasts the identity of the wireless transmitter 120 along with the location via the interface, e.g., wireless interface 128. The control unit 123 may be provided by a bus 123$b$, processor 123$p$ and associated memory 123$m$, hardware 123$h$, firmware 123$f$, and software 123$s$, and a clock 123$c$, that is used to time the duration of any power cycles. The control unit 123 is further illustrated as including a broadcasting module 124 that receives the location and prepares a control frame or other broadcast message that includes the identity and location of the wireless transmitter. The control unit 123 further includes a validation data module 126 that records power cycle data, as well as the identities of nearby visible wireless transmitters to be provided to the server 110 to be provided to the server via external interface 129.

The broadcasting module 124 and validation data module 126 are illustrated separately from processor 123$p$ for clarity, but may be part of the processor 123$p$ or implemented in the processor based on instructions in the software 123$s$ which is run in the processor 123$p$. It will be understood as used herein that the processor 123$p$ can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 123h, firmware 123f, software 123s, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 123m and executed by the processor 123p. Memory 123m may be implemented within or external to the processor 123p. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, wireless transmitter 120 includes means for receiving a location of the wireless transmitter from a remote server, the location determined using at least one of crowdsourcing and wardriving, which may be, e.g., the interface 127 such as the external interface 129; and means for broadcasting an identity of the wireless transmitter with the location, such as the broadcasting module 124 and interface 127, e.g., the wireless interface 128. The wireless transmitter 120 may additionally include means for transmitting verification data about the wireless transmitter to the remote server, such as the validation data module 126 and external interface 129; and means for receiving an invalid location indicator when the location for the wireless transmitter is no longer reliable, such as the external interface 129.

Figure 8:
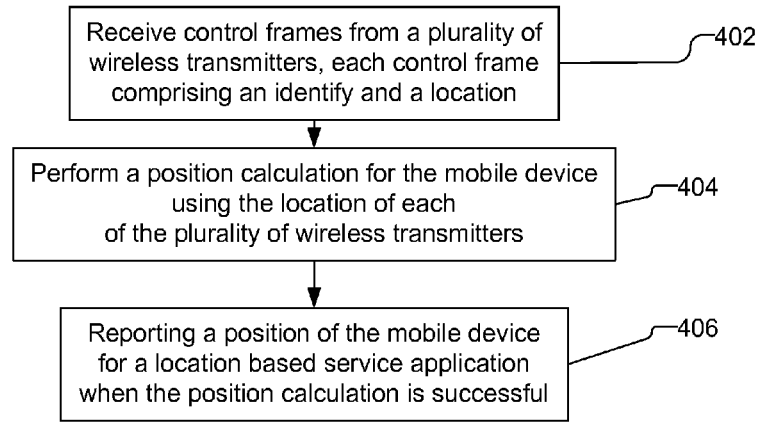
FIG. 8 is a flow chart illustrating a method of determining a position of a mobile device using locations of wireless transmitters provided in a distributed architecture.

FIG. 8 is a flow chart illustrating a method of determining a position of a mobile device using locations of wireless transmitters provided in a distributed architecture. As illustrated, a mobile device receives control frames from a plurality of wireless transmitters, each control frame comprising an identity of a wireless transmitter and a location for the wireless transmitter (402). The wireless transmitters may be, e.g., an access point, a femtocell, Bluetooth Transmitter, radio-frequency identification (RFID) and near-field communication (NFC) station, etc. A position calculation is performed for the mobile device using the location of each of the plurality of wireless transmitters (404). A position of the mobile device is reported for a location based service application when the position calculation is successful (406). Because the locations of the wireless transmitters are in the control frames provided by the wireless transmitters, data connectivity to the wireless transmitters is not necessary for the mobile device to determine a position. On the other hand, if the position calculation for the mobile device is not successful, a request may be made to a server for a location for any wireless transmitters that did not include the location in a received control frame. The location received from the server and the locations received from control frames may be used together to determine the position of the mobile device.

Figure 9:
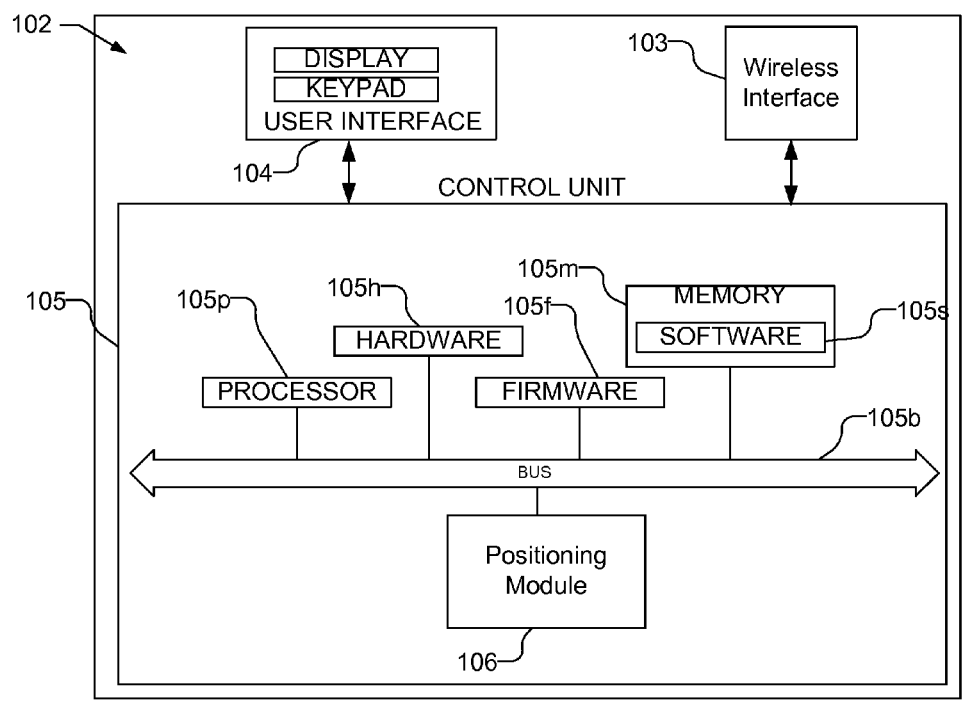
FIG. 9 is a block diagram of a mobile device capable of determining a position using locations of wireless transmitters provided in a distributed architecture.

FIG. 9 is a block diagram of a mobile device 102 capable of determining a position using locations of wireless transmitters provided in a distributed architecture. The mobile device 102 includes a wireless interface 103 that is used to receive broadcast information, including the identities and locations of wireless transmitters, such as access points, femtocells, Bluetooth Transmitters, radio-frequency identification (RFID) and near-field communication (NFC) stations. The mobile device 102 may further include a user interface 104 that may include e.g., a display, as well as a keypad or other input device through which the user can input information into the mobile device 102.

The wireless interface 103 may be used in any various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth® network, an IEEE 802.15x, or some other type of network. Moreover, any combination of WWAN, WLAN and/or WPAN may be used.

The mobile device 102 also includes a control unit 105 that is connected to and communicates with the wireless interface 103. The control unit 105 accepts and processes the locations provided by the wireless transmitters. The control unit 105 may be provided by a bus 105b, processor 105p and associated memory 105m, hardware 105h, firmware 105f, and software 105s. The control unit 105 is further illustrated as including a positioning module 106, which generates the position of the mobile device based on the received locations.

The positioning module 106 is illustrated separately from processor 105p for clarity, but may be part of the processor 105p or implemented in the processor based on instructions in the software 105s which is run in the processor 105p. It will be understood as used herein that the processor 105p can, but need not necessarily include, one or more microprocessors, embedded processors, controllers, application specific integrated circuits (ASICs), digital signal processors (DSPs), and the like. The term processor is intended to describe the functions implemented by the system rather than specific hardware. Moreover, as used herein the term "memory" refers to any type of computer storage medium, including long term, short term, or other memory associated with the mobile device, and is not to be limited to any particular type of memory or number of memories, or type of media upon which memory is stored.

The methodologies described herein may be implemented by various means depending upon the application. For example, these methodologies may be implemented in hardware 105h, firmware 105f, software 105s, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in memory 105m and executed by the processor 105p. Memory 105m may be implemented within or external to the processor 105p. If implemented in firmware and/or software, the functions may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Thus, mobile device 102 may include means for receiving with a mobile device control frames from a plurality of wireless transmitters, each control frame comprising an identity of a wireless transmitter and locations of the wireless transmitter, such as wireless interface 103. Means for performing a position calculation for the mobile device using the location of each of the plurality of wireless transmitters, may be, e.g., the positioning module 106. Means for reporting a position of the mobile device for a location based service application when the position calculation is successful may be, e.g., the wireless interface 103 or, e.g., the processor 105p when the location based service application is a local application. Means for requesting from a server a location for any wireless transmitters that did not include the location in a received control frame when the position calculation for the mobile device is not successful, may be, e.g., the wireless interface 103. Additionally, means for using the location received from the server and the locations received from control frames to determine the position of the mobile device may be, e.g., the positioning module 106.

Although the present invention is illustrated in connection with specific embodiments for instructional purposes, the present invention is not limited thereto. Various adaptations and modifications may be made without departing from the scope of the invention. Therefore, the spirit and scope of the appended claims should not be limited to the foregoing description.

What is claimed is:

1. A method comprising:
a server receiving location data about a wireless transmitter, wherein the wireless transmitter provides wireless signals to mobile devices with which positions of the mobile devices are determined and wherein the wireless transmitter is selected from a group consisting of a cell tower, a base station, an access point, a femtocell, Bluetooth Transmitter, radio-frequency identification (RFID) and near-field communication (NFC) station, the location data obtained from at least one of crowdsourcing, wardriving or combination thereof;
the server determining a location for the wireless transmitter using the location data; and
the server providing the location for the wireless transmitter to the wireless transmitter.

2. The method of claim 1, further comprising:
authenticating that the wireless transmitter is authorized to receive the location for the wireless transmitter prior to providing the location for the wireless transmitter to the wireless transmitter.

3. The method of claim 1, further comprising:
receiving data from the wireless transmitter; and
determining validity of the location for the wireless transmitter using the data received from the wireless transmitter.

4. The method of claim 3, wherein the data received from the wireless transmitter is data selected from a group consisting of an identity of a nearby wireless transmitter, and a time and duration of a power cycle for the wireless transmitter.

5. The method of claim 4, wherein determining the validity of the location comprises using data selected from the group consisting of the identity of the nearby wireless transmitter, and the time and duration of the power cycle to determine if the wireless transmitter has likely been moved.

6. An apparatus comprising:
an external interface capable of communicating with mobile devices to receive location data about a wireless transmitter, wherein the wireless transmitter provides wireless signals to mobile devices with which positions of the mobile devices are determined and wherein the wireless transmitter is selected from a group consisting of a cell tower, a base station, an access point, a femtocell, Bluetooth Transmitter, radio-frequency identification (RFID) and near-field communication (NFC) station, the location data obtained from at least one of crowdsourcing, wardriving or combination thereof; and
a processor configured to determine a location for the wireless transmitter using the location data, and to cause the external interface to transmit the location for the wireless transmitter to the wireless transmitter.

7. The apparatus of claim 6, wherein:
the external interface is further capable of communicating with the wireless transmitter to receive verification data from the wireless transmitter, wherein the processor is further configured to determine validity of the location for the wireless transmitter using the verification data received from the wireless transmitter.

8. The apparatus of claim 7, wherein the verification data received from the wireless transmitter is data selected from a group consisting of an identity of a nearby wireless transmitter, and a time and duration of a power cycle for the wireless transmitter.

9. The apparatus of claim 8, wherein the processor is configured to determine the validity of the location by being configured to use the data selected from the group consisting of the identity of the nearby wireless transmitter, and the time and duration of the power cycle to determine if the wireless transmitter has likely been moved.

10. An apparatus comprising:
means for receiving location data about a wireless transmitter, wherein the wireless transmitter provides wireless signals to mobile devices with which positions of the mobile devices are determined and wherein the wireless transmitter is selected from a group consisting of a cell tower, a base station, an access point, a femtocell, Bluetooth Transmitter, radio-frequency identification (RFID) and near-field communication (NFC) station, the location data obtained from at least one of crowdsourcing, wardriving or combination thereof;
means for determining a location for the wireless transmitter using the location data; and
means for providing the location for the wireless transmitter to the wireless transmitter.

11. The apparatus of claim 10, further comprising:
means for authenticating that the wireless transmitter is authorized to receive the location for the wireless transmitter prior to providing the location for the wireless transmitter to the wireless transmitter.

12. The apparatus of claim 10, further comprising:
means for receiving data from the wireless transmitter; and
means for determining validity of the location for the wireless transmitter using the data received from the wireless transmitter.

13. The apparatus of claim 12, wherein the data received from the wireless transmitter is data selected from a group consisting of an identity of a nearby wireless transmitter, and a time and duration of a power cycle for the wireless transmitter.

14. A non-transitory computer-readable medium including program code stored thereon, comprising:
program code to determine a location for a wireless transmitter using location data received about the wireless transmitter, wherein the wireless transmitter provides wireless signals to mobile devices with which positions of the mobile devices are determined and wherein the wireless transmitter is selected from a group consisting of a cell tower, a base station, an access point, a femtocell, Bluetooth Transmitter, radio-frequency identification (RFID) and near-field communication (NFC) station, the location data obtained from at least one of crowdsourcing, wardriving or combination thereof; and
program code to provide the location for the wireless transmitter to the wireless transmitter.

15. The non-transitory computer-readable medium of claim 14, further comprising:
program code to determine validity of the location for the wireless transmitter using data received from the wireless transmitter.

16. A method of controlling a wireless transmitter, the method comprising:
the wireless transmitter receiving a location of the wireless transmitter from a remote server, wherein the wireless transmitter provides wireless signals to mobile devices with which positions of the mobile devices are determined and wherein the wireless transmitter is selected from a group consisting of a cell tower, a base station, an access point, a femtocell, Bluetooth Transmitter, radio-frequency identification (RFID) and near-field communication (NFC) station, the location determined using at least one of crowdsourcing, wardriving or combination thereof; and
the wireless transmitter broadcasting an identity of the wireless transmitter with the location.

17. The method of claim 16, further comprising:
transmitting verification data about the wireless transmitter to the remote server; and
receiving an invalid location indicator when the location of the wireless transmitter is no longer reliable.

18. The method of claim 17, wherein the verification data is data selected from a group consisting of an identity of a nearby wireless transmitter, and a time and duration of a power cycle for the wireless transmitter.

19. A wireless transmitter comprising:
an interface that receives a location of the wireless transmitter from a remote server, wherein the wireless transmitter provides wireless signals to mobile devices with which positions of the mobile devices are determined and wherein the wireless transmitter is selected from a group consisting of a cell tower, a base station, an access point, a femtocell, Bluetooth Transmitter, radio-frequency identification (RFID) and near-field communication (NFC) station, the location determined using at least one of crowdsourcing, wardriving or combination thereof; and
a processor configured to cause the interface to broadcast an identity of the wireless transmitter with the location.

20. The wireless transmitter of claim 19, wherein the interface comprises:
a first interface to receive the location of the wireless transmitter from the remote server; and
a second interface to wirelessly broadcast the identity of the wireless transmitter with the location.

21. The wireless transmitter of claim 19, wherein the processor is further configured to cause the interface to transmit verification data about the wireless transmitter to the remote server; and to receive an invalid location indicator when the location of the wireless transmitter is no longer reliable.

22. The wireless transmitter of claim 21, wherein the verification data is data selected from a group consisting of an identity of a nearby wireless transmitter, and a time and duration of a power cycle for the wireless transmitter.

23. A wireless transmitter comprising:
means for receiving a location of the wireless transmitter from a remote server, wherein the wireless transmitter provides wireless signals to mobile devices with which positions of the mobile devices are determined and wherein the wireless transmitter is selected from a group consisting of a cell tower, a base station, an access point, a femtocell, Bluetooth Transmitter, radio-frequency identification (RFID) and near-field communication (NFC) station, the location determined using at least one of crowdsourcing, wardriving or combination thereof; and
means for broadcasting an identity of the wireless transmitter with the location.

24. The wireless transmitter of claim 23, further comprising:
means for transmitting verification data about the wireless transmitter to the remote server; and means for receiving an invalid location indicator when the location of the wireless transmitter is no longer reliable.

25. The wireless transmitter of claim 24, wherein the verification data is data selected from a group consisting of an identity of a nearby wireless transmitter, and a time and duration of a power cycle for the wireless transmitter.

26. A non-transitory computer-readable medium including program code stored thereon, comprising:
program code to receive a location of a wireless transmitter from a remote server, wherein the wireless transmitter provides wireless signals to mobile devices with which positions of the mobile devices are determined and wherein the wireless transmitter is selected from a group consisting of a cell tower, a base station, an access point, a femtocell, Bluetooth Transmitter, radio-frequency identification (RFID) and near-field communication (NFC) station, the location obtained using at least one of crowdsourcing, wardriving or combination thereof; and
program code to broadcast an identity of the wireless transmitter with the location.

27. The non-transitory computer-readable medium of claim 26, further comprising:
program code to transmit verification data about the wireless transmitter to the remote server; and
program code to receive an invalid location indicator when the location of for the wireless transmitter is no longer reliable.

28. The method of claim 1, further comprising:
receiving from the wireless transmitter data comprising an identity of a nearby wireless transmitter; and
determining validity of the location for the wireless transmitter using the data received from the wireless transmitter.

29. The apparatus of claim 6, wherein:
the external interface is further capable of communicating with the wireless transmitter to receive verification data from the wireless transmitter comprising an identity of a nearby wireless transmitter, wherein the processor is further configured to determine validity of the location for the wireless transmitter using the verification data received from the wireless transmitter.

30. The apparatus of claim 10, further comprising:
means for receiving from the wireless transmitter data comprising an identity of a nearby wireless transmitter; and
means for determining validity of the location for the wireless transmitter using the data received from the wireless transmitter.

31. The non-transitory computer-readable medium of claim 14, further comprising:
program code to determine validity of the location for the wireless transmitter using data received from the wireless transmitter comprising an identity of a nearby wireless transmitter.

32. The method of claim 16, further comprising:
transmitting verification data about the wireless transmitter comprising an identity of a nearby wireless transmitter to the remote server; and
receiving an invalid location indicator when the location of the wireless transmitter is no longer reliable.

33. The wireless transmitter of claim 19, wherein the processor is further configured to cause the interface to transmit verification data about the wireless transmitter comprising an identity of a nearby wireless transmitter to the remote server; and to receive an invalid location indicator when the location of the wireless transmitter is no longer reliable.

34. The wireless transmitter of claim 23, further comprising:
means for transmitting verification data about the wireless transmitter comprising an identity of a nearby wireless transmitter to the remote server; and
means for receiving an invalid location indicator when the location of the wireless transmitter is no longer reliable.

35. The non-transitory computer-readable medium of claim 26, further comprising:
program code to transmit verification data about the wireless transmitter comprising an identity of a nearby wireless transmitter to the remote server; and
program code to receive an invalid location indicator when the location of for the wireless transmitter is no longer reliable.

\* \* \* \* \*